US012625987B2

(12) United States Patent

Yadav et al.

(10) Patent No.: US 12,625,987 B2

(45) Date of Patent: May 12, 2026

(54) METHOD AND SYSTEM FOR EXECUTING A SECURE FILE-LEVEL RESTORE FROM A BLOCK-BASED BACKUP

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 272 days.

(21) Appl. No.: 17/872,108

(22) Filed: Jul. 25, 2022

(65) Prior Publication Data

US 2024/0028753 A1 Jan. 25, 2024

(51) Int. Cl.
*G06F 21/62* (2013.01)
*G06F 11/1446* (2026.01)
*G06F 16/13* (2019.01)

(52) U.S. Cl.
CPC ...... *G06F 21/6218* (2013.01); *G06F 11/1469* (2013.01); *G06F 16/13* (2019.01); *G06F 2201/84* (2013.01)

(58) Field of Classification Search
CPC ...... G06F 21/60; G06F 21/62; G06F 21/6208; G06F 21/6218; G06F 21/6227; G06F 2201/84; G06F 16/13; G06F 16/14
See application file for complete search history.

(56) References Cited

U.S. PATENT DOCUMENTS

| | | | |
|---|---|---|---|
| 6,185,574 B1 | 2/2001 | Howard et al. |
| 7,415,585 B1 | 8/2008 | Rossi |
| 7,694,103 B1 | 4/2010 | Kushwah |
| 7,873,601 B1 | 1/2011 | Kushwah |

(Continued)

FOREIGN PATENT DOCUMENTS

| | | | |
|---|---|---|---|
| CN | 103500129 B | 8/2017 |
| CN | 111241062 A | 6/2020 |

(Continued)

OTHER PUBLICATIONS

Lipika Deka et al., "Consistent Online Backup in Transactional File Systems", IEEE Transactions ON Knowledge and Data Engineering, vol. 26, No. 11, Nov. 2014, pp. 2676-2688.

*Primary Examiner* — Shewaye Gelagay
*Assistant Examiner* — Ayub A Maye
(74) *Attorney, Agent, or Firm* — Chamberlain, Hrdlicka, White, Williams & Aughtry; Aly Z. Dossa

(57) ABSTRACT

A method for managing a block-based backup (BBB) includes: sending a file system parsing request to a file system, in which the file system is backed up in a backup storage as the BBB; obtaining file system metadata, in which the file system metadata is generated and stored in the backup storage in response to the file system parsing request; analyzing the file system metadata to generate an index for each asset of the file system; reordering the index of each asset to generate a reordered index; determining a user access level of a user; identifying assets in the reordered index to obtain a set of permitted assets for the user; providing a graphical user interface (GUI) specifying the set of permitted assets; receiving selected assets among the set of permitted assets via the GUI; and restoring the selected assets from the BBB.

20 Claims, 10 Drawing Sheets

(56) References Cited

U.S. PATENT DOCUMENTS

| | | | |
|---|---|---|---|
| 8,037,032 B2 | 10/2011 | Pershin et al. | |
| 8,200,637 B1 | 6/2012 | Stringham | |
| 8,214,406 B2 | 7/2012 | Kushwah | |
| 8,244,681 B2 | 8/2012 | Laffin | |
| 8,719,286 B1 * | 5/2014 | Xing | G06F 11/1451 |
| | | | 707/755 |
| 8,751,515 B1 * | 6/2014 | Xing | G06F 16/113 |
| | | | 707/755 |
| 9,158,632 B1 | 10/2015 | Xing | |
| 9,171,002 B1 | 10/2015 | Mam et al. | |
| 9,348,827 B1 | 5/2016 | Patwardhan et al. | |
| 9,411,821 B1 | 8/2016 | Patwardhan et al. | |
| 9,424,137 B1 | 8/2016 | Mam | |
| 9,569,446 B1 | 2/2017 | Feathergill et al. | |
| 9,747,169 B2 | 8/2017 | Kottomtharayil et al. | |
| 9,805,068 B1 | 10/2017 | Sabjan | |
| 9,934,104 B2 | 4/2018 | Kushwah et al. | |
| 10,146,629 B1 * | 12/2018 | Yadav | G06F 11/1461 |
| 10,241,870 B1 | 3/2019 | Beatty | |
| 10,338,823 B2 | 7/2019 | Kottomtharayil et al. | |
| 10,372,547 B1 | 8/2019 | Zhu et al. | |
| 10,409,693 B1 * | 9/2019 | Liang | G06F 16/164 |
| 10,585,752 B1 | 3/2020 | Chopra et al. | |
| 10,642,790 B1 | 5/2020 | Brenner | |
| 10,678,652 B1 | 6/2020 | Rangapuram | |
| 10,769,103 B1 * | 9/2020 | Patwardhan | G06F 16/128 |
| 10,838,821 B2 | 11/2020 | Bhagi et al. | |
| 10,872,069 B2 | 12/2020 | Dornemann et al. | |
| 11,340,824 B1 | 5/2022 | Yadav et al. | |
| 11,467,914 B2 | 10/2022 | Bhagi et al. | |
| 11,513,921 B1 | 11/2022 | Yadav et al. | |
| 2004/0028042 A1 | 2/2004 | Srinivasan et al. | |
| 2005/0078196 A1 | 4/2005 | Okamoto | |
| 2005/0166082 A1 | 7/2005 | Williams et al. | |
| 2005/0246398 A1 | 11/2005 | Barzilai et al. | |
| 2007/0006018 A1 * | 1/2007 | Thompson | G06F 11/1466 |
| | | | 714/6.12 |
| 2008/0124050 A1 | 5/2008 | Deschamp et al. | |
| 2009/0276591 A1 | 11/2009 | Mu et al. | |
| 2010/0293147 A1 | 11/2010 | Snow et al. | |
| 2011/0107043 A1 | 5/2011 | Palagummi | |
| 2011/0125714 A1 | 5/2011 | Manson | |
| 2012/0084261 A1 | 4/2012 | Parab | |
| 2012/0303405 A1 * | 11/2012 | Bruno | G06Q 10/10 |
| | | | 705/7.19 |
| 2013/0339298 A1 | 12/2013 | Muller et al. | |
| 2014/0068713 A1 | 3/2014 | Nicholson et al. | |
| 2014/0149701 A1 | 5/2014 | Osada | |
| 2014/0181441 A1 | 6/2014 | Kottomtharayil et al. | |
| 2014/0181442 A1 | 6/2014 | Kottomtharayil et al. | |
| 2014/0181443 A1 | 6/2014 | Kottomtharayil et al. | |
| 2014/0195791 A1 | 7/2014 | Teli | |
| 2014/0195848 A1 | 7/2014 | Teli | |
| 2016/0078245 A1 | 3/2016 | Amarendran et al. | |
| 2016/0125527 A1 * | 5/2016 | Marinova | G06Q 10/101 |
| | | | 705/36 R |
| 2016/0127307 A1 | 5/2016 | Jain et al. | |
| 2016/0188582 A1 | 6/2016 | Sprague et al. | |
| 2016/0259694 A1 | 9/2016 | Huang et al. | |
| 2017/0046233 A1 | 2/2017 | Shivanna | |
| 2017/0090770 A1 | 3/2017 | Minamiura et al. | |
| 2018/0018236 A1 | 1/2018 | Kottomtharayil et al. | |
| 2018/0095960 A1 | 4/2018 | Tan | |
| 2018/0225177 A1 | 8/2018 | Bhagi et al. | |
| 2018/0295400 A1 | 10/2018 | Thomas et al. | |
| 2018/0322017 A1 | 11/2018 | Maccanti et al. | |
| 2019/0087279 A1 * | 3/2019 | Kumar | G06F 11/1469 |
| 2019/0324661 A1 | 10/2019 | Kottomtharayil et al. | |
| 2020/0233845 A1 | 7/2020 | Dornemann et al. | |
| 2020/0245034 A1 | 7/2020 | Dunker et al. | |
| 2021/0026739 A1 | 1/2021 | Bhagi et al. | |
| 2021/0133040 A1 | 5/2021 | Bansal et al. | |
| 2021/0208788 A1 | 7/2021 | Kottomtharayil et al. | |
| 2021/0240569 A1 | 8/2021 | Chopra et al. | |
| 2021/0240573 A1 | 8/2021 | Upadhyay et al. | |
| 2021/0248044 A1 | 8/2021 | Perneti et al. | |
| 2021/0303405 A1 | 9/2021 | Slater | |
| 2021/0326220 A1 | 10/2021 | Srinivasan et al. | |
| 2021/0397520 A1 * | 12/2021 | Morton | G06F 21/6218 |
| 2021/0406129 A1 | 12/2021 | Zheng et al. | |
| 2022/0011991 A1 | 1/2022 | Okuno | |
| 2022/0083426 A1 | 3/2022 | Chopra et al. | |
| 2022/0229739 A1 | 7/2022 | Nara | |
| 2022/0382641 A1 | 12/2022 | Chopra et al. | |
| 2022/0398161 A1 | 12/2022 | Yadav et al. | |
| 2022/0398162 A1 | 12/2022 | Yadav et al. | |
| 2022/0398164 A1 | 12/2022 | Yadav et al. | |
| 2022/0413967 A1 | 12/2022 | Bhagi et al. | |
| 2023/0094628 A1 | 3/2023 | Yadav et al. | |

FOREIGN PATENT DOCUMENTS

| | | |
|---|---|---|
| EP | 3796174 B1 | 10/2022 |
| WO | 2011002777 A2 | 1/2011 |
| WO | 2015110171 A1 | 7/2015 |
| WO | 2015142676 A1 | 9/2015 |
| WO | 2018081737 A1 | 5/2018 |

* cited by examiner

Recovery Host <u>300</u>

Recovery Agent <u>310</u>

Persistent Storage <u>320</u>

FIG. 3

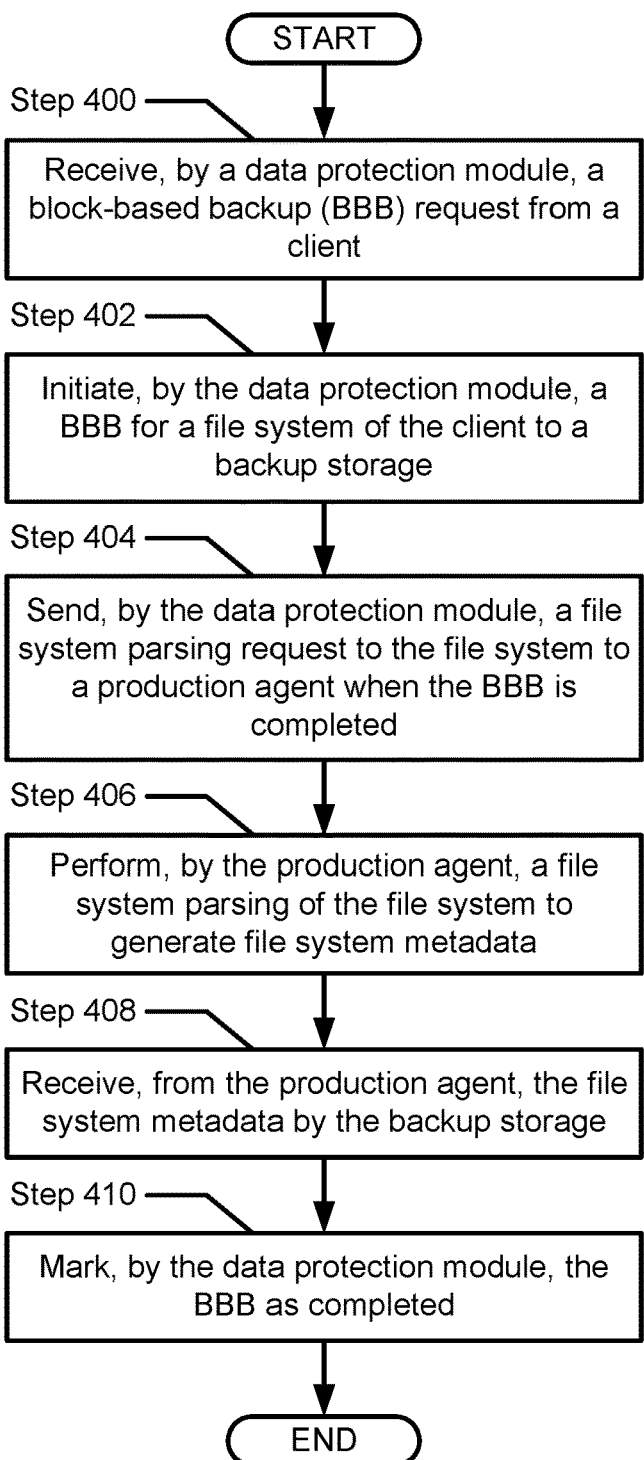
FIG. 4.1

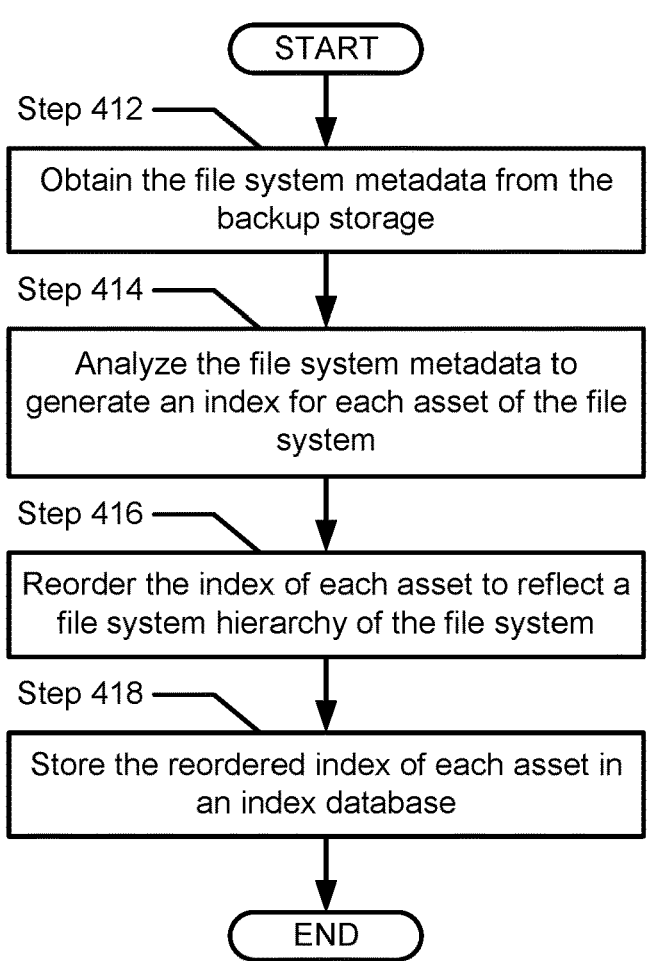
FIG. 4.2

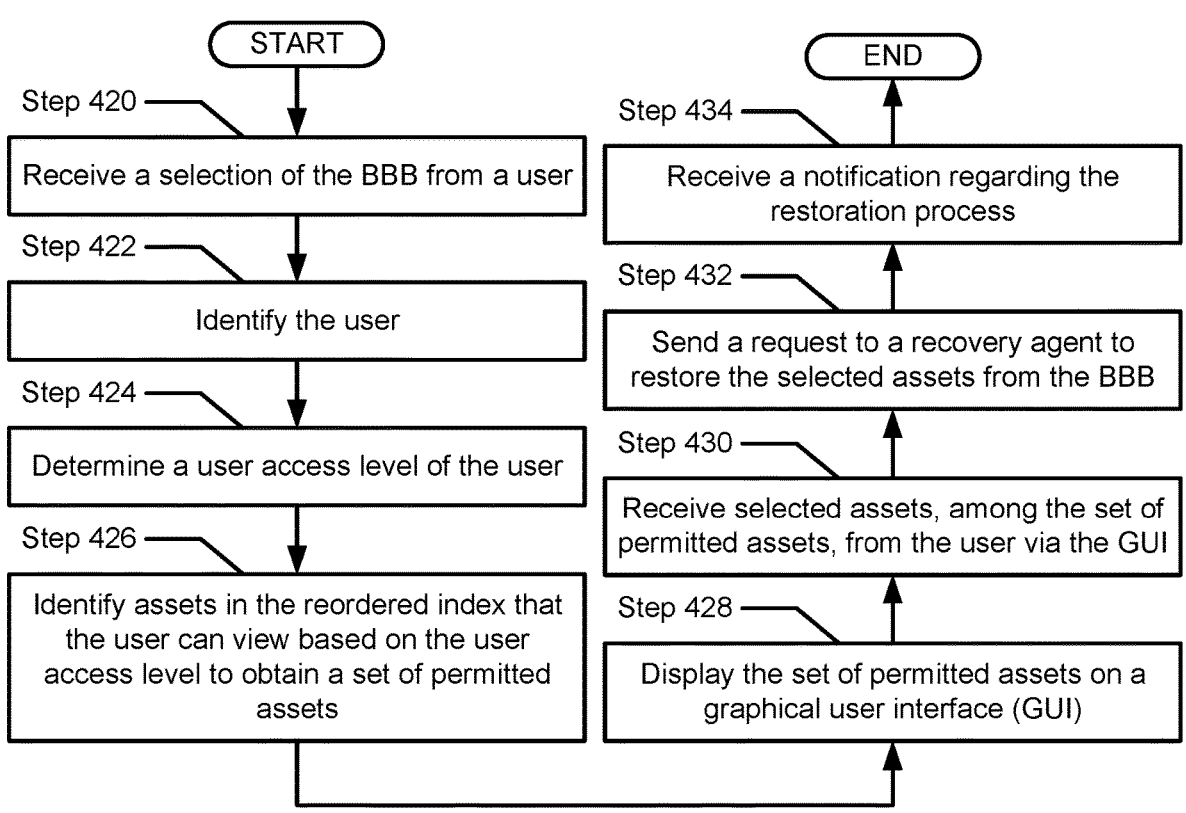

Step 420 — Receive a selection of the BBB from a user

Step 422 — Identify the user

Step 424 — Determine a user access level of the user

Step 426 — Identify assets in the reordered index that the user can view based on the user access level to obtain a set of permitted assets Step 428 — Display the set of permitted assets on a graphical user interface (GUI)

Step 430 — Receive selected assets, among the set of permitted assets, from the user via the GUI Step 432 — Send a request to a recovery agent to restore the selected assets from the BBB Step 434 — Receive a notification regarding the restoration process

FIG. 4.3

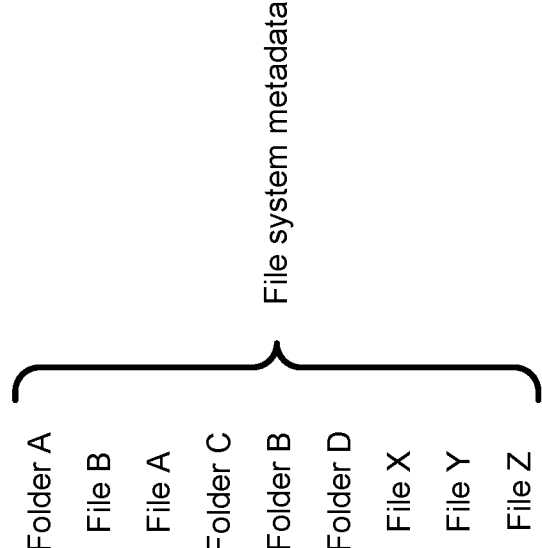
FIG. 5.1

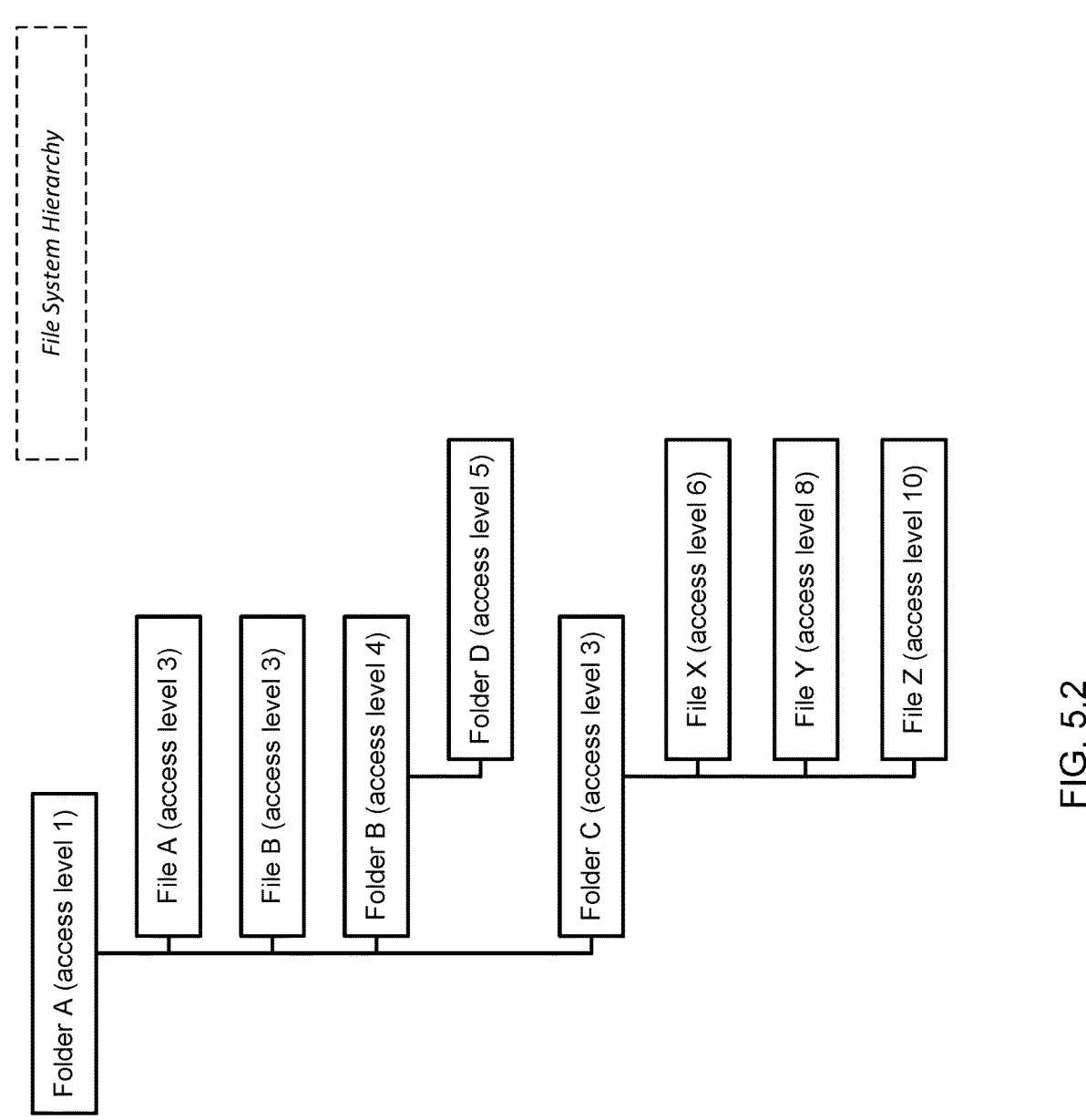
FIG. 5.2

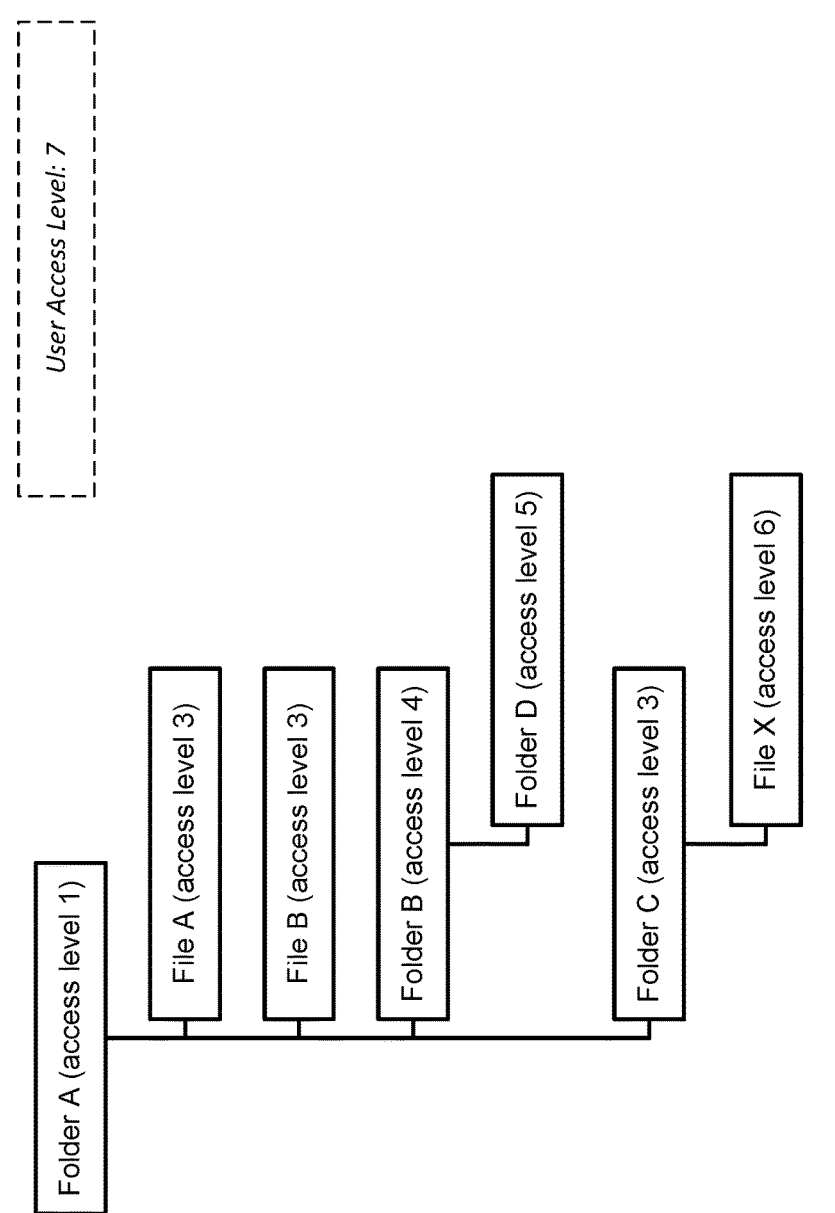
FIG. 5.3

600

METHOD AND SYSTEM FOR EXECUTING A SECURE FILE-LEVEL RESTORE FROM A BLOCK-BASED BACKUP

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 3 shows a diagram of a recovery host in accordance with one or more embodiments of the invention.

FIGS. 4.1-4.3 show a method for executing a secure file-level restore from a block-based backup (BBB) in accordance with one or more embodiments of the invention.

FIG. 5.1 shows an example file system metadata in accordance with one or more embodiments of the invention.

FIGS. 5.2 and 5.3 show an example reordered index in accordance with one or more embodiments of the invention.

DETAILED DESCRIPTION

Figure 1:
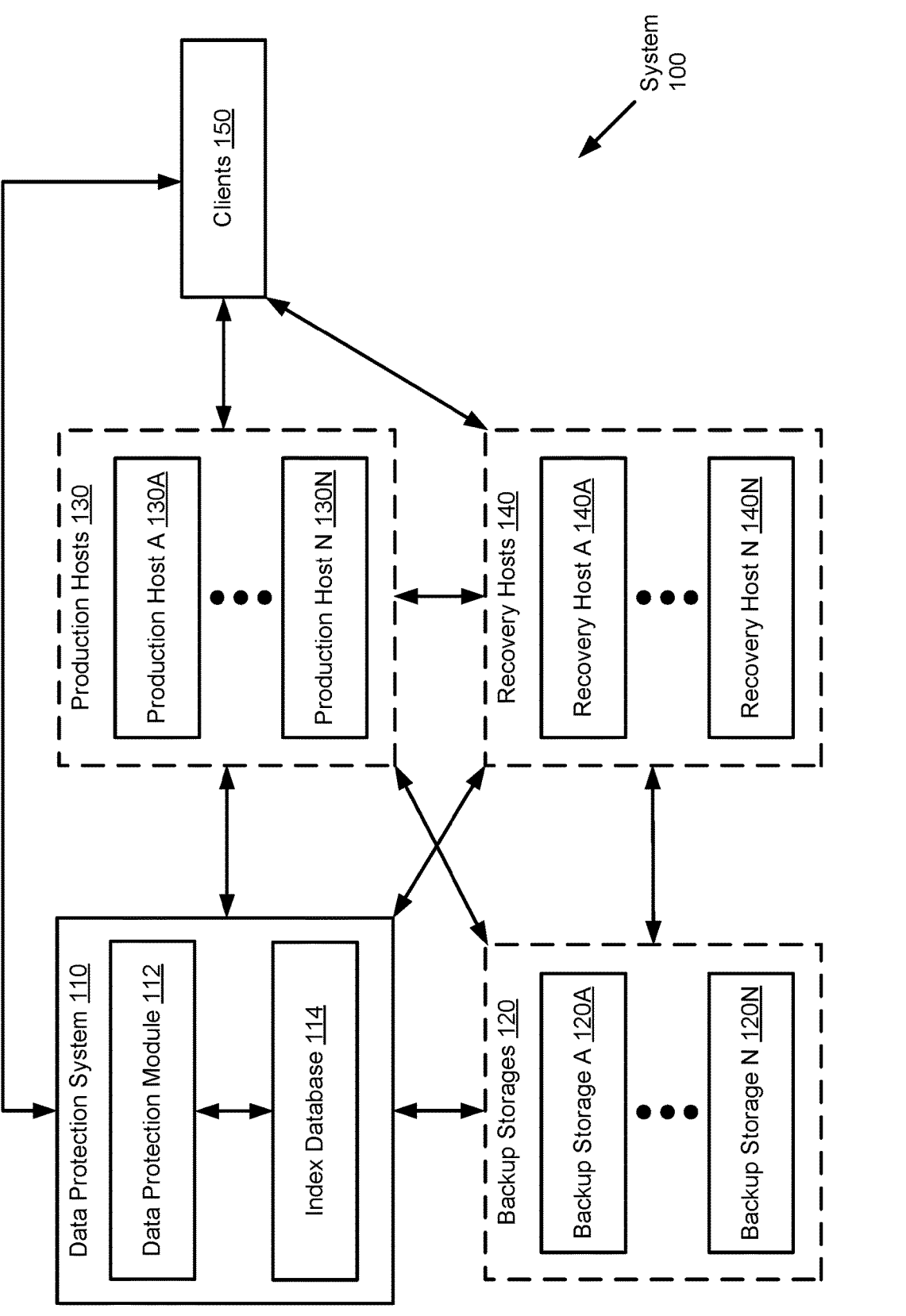
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, to initiate (e.g., instantiate, execute, etc.) a file-level restore from a block-based backup (BBB), the BBB has to be mounted (e.g., become accessible) to a recovery host. Typically, when the BBB is mounted to the recovery host, unauthorized entities (e.g., unauthorized users, applications, etc.) may access all of the assets (e.g., files, folders, etc.) available in the BBB. Mounting the BBB to the recovery host may also prevent execution of a secure file-level restore from the BBB. As such, embodiments of the invention relate to methods and systems for executing a secure file-level restore from a BBB. More specifically, various embodiments of the invention may first send a file system parsing request to a file system that is backed up in a backup storage. The file system may be backed up as the BBB. In response to the file system parsing request, file system metadata may be generated and stored in the backup storage. The file system metadata may then be analyzed to generate an index for each asset of the file system. The index of each asset may be reordered to generate a reordered index that reflects a file system hierarchy of the file system.

At some later point in time, when a user attempts to access the reordered index, an access level of each asset may be obtained from the file system hierarchy. Based on comparing the access level of each asset against a user access level of the user, the user may view (via a graphical user interface (GUI)) one or more assets in the reordered index. The assets that the user can view in the reordered index may then be identified to obtain a set of permitted assets for the user. One or more selected assets among the set of permitted assets may be received via the GUI. Finally, the selected assets may be restored from the BBB. As a result of these processes, one or more embodiments disclosed herein advantageously provide the secure file-level restore from the BBB without mounting the BBB to the recovery host.

The following describes various embodiments of the invention.

FIG. 1 shows a diagram of a system (100) in accordance with one or more embodiments of the invention. The system (100) includes a data protection system (110), backup storages (120), production hosts (130), recovery hosts (140), and clients (150). The system (100) may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the data protection system (110) may include a data protection module (112) and an index database (114). The data protection module (112) and the index database (114) may be physical or logical devices, as discussed below.

In one or more embodiments of the invention, the data protection module (112) may provide backup services to the production hosts (130). The backup services may include generation and storage of backups (e.g., BBB s) in the backup storages (120). The backup services may also include restoration (e.g., recovery) of the production hosts (130) to the recovery hosts (140) using the backups stored in the backup storages (120).

More specifically, the data protection module (112) may provide backup services to the production hosts (130) by orchestrating: (i) generation of backups of the production hosts (130), (ii) storage of the generated backups of the production hosts (130) in the backup storages (120), (iii) consolidation of backup requests to reduce or prevent generation of backups that are not useful for restoration purposes, and (iv) restoration of the production hosts (130) to previous states using backups stored in the backup storages (120).

Additionally, to provide the aforementioned backup services, the data protection module (112) may include functionality to generate and issue instructions to any component of the system (100) of FIG. 1. In one or more embodiments, the data protection module (112) may also generate instructions in response to backup requests from other entities.

In one or more embodiments of the invention, the data protection module (112) may generate such instructions in accordance with backup schedules that specify when backups are to be generated. In one or more embodiments, a backup schedule may lay out specific points in time for a backup process to be performed. Additionally, these backup schedules may be configured based on a user's recovery point objective (RPO).

More specifically, in one or more embodiments of the invention, the time between a data loss event and a most recent backup may be referred to herein as the "user's RPO." For example, if a user has a 4-hour RPO for an application (e.g., software), then the maximum gap between the data loss event and the most recent backup will be 4-hours. In some scenarios, having a 4-hour RPO may not necessarily mean the user will lose 4 hours' worth of data. For example, a word processing application may go down at 12:35 a.m. and may be restored by 1:10 a.m. In this case, the user may not have much data to lose.

In another example, a security application may go down at 10:05 a.m. and may not be restored until 1:25 p.m. In this case, the user may lose data that is highly valuable to the user. For this reason, the user may set an RPO based on the application priority and may configure the backup schedules accordingly.

In one or more embodiments of the invention, a BBB may be backup technology used by the data protection module (112) to read blocks from a volume (e.g., a logical drive) in a file system that stores data of the production hosts (130). In one or more embodiments, the file system may divide the volume into a fixed group of bytes, which may be referred to herein as a "block" of the file system volume. The BBB may then back up the blocks that are currently being used in the file system to the backup storages (120).

In one or more embodiments of the invention, the file system may be a method in which an operating system (OS) uses to control how data is named, stored, and retrieved. For example, once a user has logged into a computing device (e.g., 600, FIG. 6), the OS of that computing device uses the file system of that computing device to retrieve one or more applications to start performing one or more operations (e.g., functions, tasks, activities, etc.).

In one or more embodiments of the invention, the BBB may directly read blocks from the volume, without tracking a file system hierarchy. While reading the blocks from the volume, the data protection module (112) may not be aware of which assets of the file system are backed up by the BBB. Additionally, the BBB may read the blocks in the order that the blocks are stored in the volume.

In one or more embodiments of the invention, as a file system backup technology, the BBB may back up, for example: a new technology file system (NTFS), a resilient file system (ReFS), a third extended file system (ext3), a fourth extended file system (ext4), etc. In one or more embodiments, to back up a file system, the BBB may use a virtual hard disk (VHDX) file format.

In one or more embodiments of the invention, the VHDX file may include, but is not limited to: a header, a log, data of an asset, etc. In one or more embodiments, the header may be a first structure in the VHDX file. As such, the header will be read first when the VHDX file is opened. The header may be one Megabyte (MB) in size and the header may include a file type identifier. The file type identifier may include a fixed-sized signature to identify a file as a VHDX file. The file type identifier may also include other features for file identification purposes without departing from the scope of the invention.

In one or more embodiments of the invention, the file type identifier may be a structure stored at offset zero of the VHDX file. In one or more embodiments, an offset may specify a structure location within a file. For example, offset zero may specify that the structure is located at the beginning of the VHDX file.

In one or more embodiments of the invention, the log of the VHDX file may include variable-sized log entries (e.g., log data). A log entry among the log entries of the log may include, for example, information of an unexpected system failure event (e.g., a power loss event). In one or more embodiments, the log may reside at a location in the VHDX file that is determined by the header.

In one or more embodiments of the invention, the data of the asset of the VHDX file may be data that is being used by the user (e.g., user data). For example, the user may use the data of the asset to execute production workloads (e.g., reading data from a table, writing data to the table, etc.) in a computing device (e.g., 600, FIG. 6).

Figure 6:
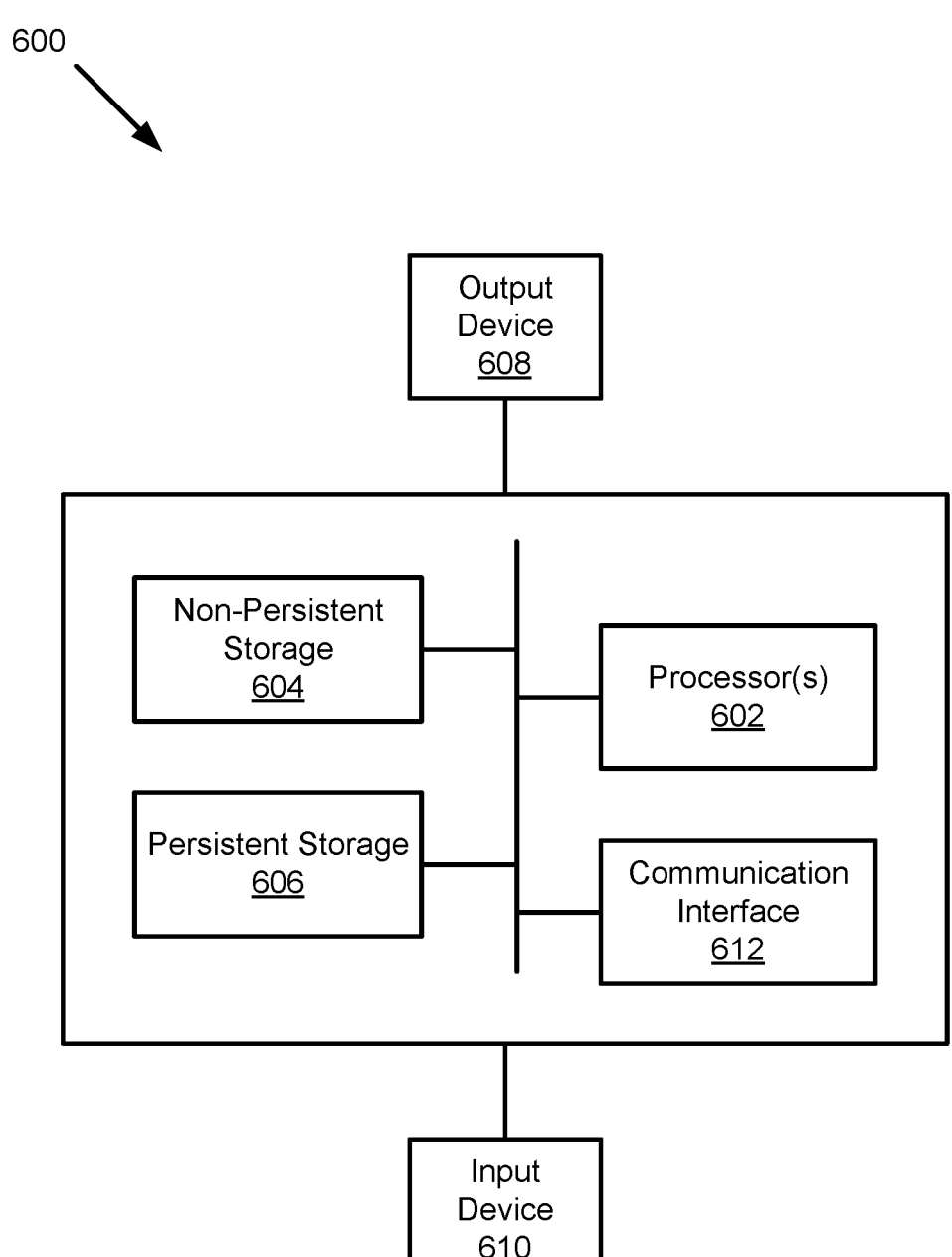
FIG. 6 shows a diagram of a computing device in accordance with one or more embodiments of the invention.

In one or more embodiments of the invention, the data protection module (112) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device, cause the computing device to perform the functionality of the data protection module (112) described throughout this application.

Alternatively, in one or more embodiments of the invention, the data protection module (112) may be implemented as a logical device. The logical device may utilize the computing resources of any number of computing devices to provide the functionality of the data protection module (112) described throughout this application.

In one or more embodiments of the invention, the index database (114) may refer to a database (or any logical container) to and from which an index of each asset may be stored and/or retrieved, respectively. The index database (114) may occupy a portion of a physical storage device or, alternatively, may span across multiple physical storage devices.

In one or more embodiments of the invention, various forms of digital data (e.g., user data, a snapshot of a volume, etc.) may be consolidated in a physical storage device. The physical storage device may include non-transitory computer readable storage media, in which all or some of the digital data may be temporarily or permanently stored.

In one or more embodiments of the invention, the physical storage device may be designed and configured based on a common or different storage technology—examples of which may include, but are not limited to: a flash based storage device, a fibre-channel (FC) based storage device, a serial advanced technology attachment (SATA) storage device, etc.

In one or more embodiments of the invention, the index database (114) may provide indexing services. In one or more embodiments, the indexing services may optimize the performance of a database by reducing a required amount of database access(es) when implementing a request (e.g., a data retrieval request). In this manner, requested data may be quickly located and accessed from the database using an index of the requested data. In one or more embodiments, an index may refer to a database structure that is defined by one or more field expressions. A field expression may be a single field name such as user_number. For example, an index (e.g., E41295) may refer to user name (e.g., Adam Smith) and user_number (e.g., 012345), in which the requested data is Adam Smith 012345. Additional details of the indexing services are described below in reference to FIG. 4.2.

In one or more embodiments of the invention, the index database (114) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the index database (114) described throughout this application.

Alternatively, in one or more embodiments of the invention, similar to the data protection module (112), the index database (114) may also be implemented as a logical device.

In one or more embodiments of the invention, the backup storages (120) may provide data storage services. For example, the backup storages (120) may store backups of the production hosts (130). The backup storages (120) may also provide copies of previously stored backups of the production hosts (130). The system (100) may include any number of backup storages (backup storage A (120A), backup storage N (120N)) without departing from the scope of the invention.

In one or more embodiments of the invention, the data protection module (112) may obtain a status of the BBB from the backup storages (120). The status of the BBB may specify information such as: (i) whether the BBB was successful and whether the backup was completed within a BBB window (e.g., 100% of the BBB was completed within the BBB window), or (ii) whether the BBB was unsuccessful and how much of the BBB was not completed within the BBB window (e.g., 70% of the BBB was completed and 30% of the BBB was not completed). In one or more embodiments, the BBB window may be a period of time, with a definite start and end, within which a BBB is set to be completed.

In one or more embodiments of the invention, the backup storages (120) may include a backup monitoring service for monitoring the status of the BBB. The backup monitoring service may be a computer program that may be executed on the underlying hardware of the backup storages (120). The backup monitoring service may also be designed and configured to facilitate remote access to check the status of and/or manipulate locally stored data during the BBB. Further, the backup monitoring service may include functionality to control remote procedure calls (e.g., application programming interface (API) calls (discussed below)) that access and manipulate any granularity of the locally stored data during the BBB.

In one or more embodiments of the invention, the backup storages (120) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the backup storages (120) described throughout this application.

Alternatively, in one or more embodiments of the invention, similar to the data protection module (112), the backup storages (120) may also be implemented as logical devices.

In one or more embodiments of the invention, the production hosts (130) may provide services to the clients (150). For example, the production hosts (130) may host any number of applications that provide application services to the clients (150). Application services may include, but are not limited to: database services, electronic communication services, instant messaging services, file storage services, etc.

In one or more embodiments of the invention, each of the production hosts (production host A (130A), production host N (130N)) of the production hosts (130) may provide the above-discussed application services by hosting applications. Each of the production hosts (130A, 130N) of the production hosts (130) may host any number of applications. Additionally, different production hosts (130A, 130N) of the production host (130) may host the same number of applications or different numbers of applications. Different production hosts (130A, 130N) of the production hosts (130) may also host similar or different applications.

In one or more embodiments of the invention, the production hosts (130) may host virtual machines (VMs) (e.g., 210, FIG. 2) that host the above-discussed applications. Each of the production hosts (130A, 130N) of the production hosts (130) may host any number of VMs that, in turn, host any number of applications. Additional details of the VMs are described below in reference to FIG. 2.

In one or more embodiments of the invention, the production hosts (130) may perform portions of a backup process (also referred to herein simply as "backup" or "backups"). For example, the production hosts (130) may initiate backups under the direction of the data protection module (112). In one or more embodiments, the production hosts (130) may include functionality to consolidate multiple backup generation requests so that duplicative backups (which may not be useful for restoration purposes) are not generated.

In one or more embodiments of the invention, the production hosts (130) may include functionality to initiate multiple backups in parallel. For example, the production hosts (130) may each host multiple backup processes. Each of the multiple backup processes may manage the initiation of a respective backup. Each of the multiple backup processes may operate concurrently to initiate multiple backups.

In one or more embodiments of the invention, the production hosts (130) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the production hosts (130) described throughout this application.

Alternatively, in one or more embodiments of the invention, similar to the data protection module (112), the production hosts (130) may also be implemented as logical devices.

In one or more embodiments of the invention, the recovery hosts (140) may provide services to the clients (150). For example, the recovery hosts (140) may host any number of applications that provide application services to the clients (150). Application services may include, but are not limited to: data restoration services, database services, electronic communication services, etc.

In one or more embodiments of the invention, similar to the production hosts (130), each of the recovery hosts (recovery host A (140A), recovery host N (140N)) of the recovery hosts (140) may also provide the above-discussed application services by hosting applications. For example, when the BBB is completed, one of the recovery hosts (140A, 140N) of the recovery hosts (140) may initiate a data restoration process (discussed in more detail below). Based on initiating the data restoration process, a user of the clients (150) may select one or more assets to restore from the BBB via a GUI (also discussed in more detail below). In one or more embodiments, the data protection module (112) may provide the GUI to the user.

In one or more embodiments of the invention, the GUI may be displayed on a display of a computing device (e.g., 600, FIG. 6) using functionalities of a display engine (not shown), in which the display engine is operatively connected to the computing device. The display engine may be implemented using hardware, software, or any combination thereof. The index of each asset in the BBB may be displayed in any visual format that would allow the user to easily comprehend (e.g., read and parse) the listed information.

In one or more embodiments of the invention, once the user has selected the assets via the GUI, the data protection module (112) sends a request (e.g., a selected assets restore request) to a recovery agent (e.g., 310, FIG. 3) of one of the recovery hosts (140A, 140N). The recovery agent (e.g., 310, FIG. 3) may then make an API call to the backup storages (120) to access the selected assets in the BBB.

In one or more embodiments, an API call may refer to a process of an application submitting a request to an API to retrieve the requested data from an external application. An API may represent a collection of methods and procedures (e.g., retrieving information about an API source, updating the API source, etc.) that may be executed by one or more applications in a computing device (e.g., 600, FIG. 6). The collection of methods and procedures may be designed and configured to facilitate the recovery agent's (e.g., 310, FIG. 3) access to manipulate the BBB.

In one or more embodiments of the invention, based on receiving the API call from the recovery agent (e.g., 310, FIG. 3), the backup storages (120) may allow the recovery agent (e.g., 310, FIG. 3) to access the BBB. The recovery agent (e.g., 310, FIG. 3) may then read data of the selected assets from the BBB. More specifically, the recovery agent (e.g., 310, FIG. 3) may read the data of the selected assets from VHDX files in the BBB that store the selected assets. The recovery agent (e.g., 310, FIG. 3) may then restore the selected assets to the recovery host (140A, 140N) of the recovery hosts (140) using components (e.g., file system metadata components) provided in the request. Additionally, the recovery agent (e.g., 310, FIG. 3) may assign one or more asset features (e.g., one or more attributes of an asset, an access control list (ACL) of the asset, etc.) to the restored selected assets using the file system metadata components. Additional details of the file system metadata components and the data restoration process are described below in reference to FIGS. 4.1 and 4.3, respectively.

In one or more embodiments of the invention, the recovery agent (e.g., 310, FIG. 3) may perform portions of the restoration process. For example, the recovery agent (e.g., 310, FIG. 3) may include functionality to consolidate multiple restore requests to prevent generation of duplicative restorations. Preventing the generation of duplicative restorations may reduce a restoration window. In one or more embodiments, the restoration window may be a period of time, with a definite start and end, within which an asset restoration is set to be completed.

In one or more embodiments of the invention, the recovery hosts (140) may include functionality to initiate multiple restorations in parallel. For example, the recovery hosts (140) may each host multiple restoration processes. Each of the multiple restoration processes may manage the initiation of a respective restoration. Each of the multiple restoration processes may operate concurrently to initiate multiple restorations.

In one or more embodiments of the invention, the recovery hosts (140) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the recovery hosts (140) described throughout this application.

Alternatively, in one or more embodiments of the invention, similar to the data protection module (112), the recovery hosts (140) may also be implemented as logical devices.

In one or more embodiments of the invention, the clients (150) may interact with the production hosts (130). For example, the clients (150) may utilize application services provided by the production hosts (130). When the clients (150) interact with the production hosts (130), data that is relevant to the clients (150) may be stored in the production hosts (130). For example, consider a scenario in which the production hosts (130) host a database utilized by the clients (150). In this scenario, the database may be a client database associated with the users of the clients (150). When a new user is identified, the clients (150) may add information regarding the new user to the database. By doing so, the data that is relevant to the clients (150) may be stored in the production hosts (130). This may be done because the clients (150) may desire access to the data regarding the new user at some point in time.

In one or more embodiments of the invention, the clients (150) may include functionality to use services provided by the production hosts (130). For example, the clients (150) may host an application that interacts with an application database hosted by the production hosts (130). When an application upgrade is available to fix critical application related issues, a production agent (e.g., 230, FIG. 2) may identify the clients (150) that require the application upgrade. The application database may then provide the application upgrade to the identified clients. By doing so, the application hosted by the identified clients may be kept up-to-date. Additional details of the production agent are described below in reference to FIG. 2.

In one or more embodiments of the invention, the clients (150) may also interact with the recovery hosts (140). For example, the clients (150) may utilize the above-discussed data restoration services provided by the recovery hosts (140).

In one or more embodiments of the invention, the clients (150) may configure the VMs of the production hosts (130) before performing a backup. The clients (150) may also orchestrate the backup services provided by the data protection module (112).

In one or more embodiments of the invention, the clients (150) send instructions to the production agent (e.g., 230, FIG. 2) to configure the VMs. More specifically, the production agent (e.g., 230, FIG. 2) may configure the VMs under the direction of the clients (150). In one or more embodiments, the instructions may include, but are not limited to: instructions for configuring a backup policy (e.g., the RPO), instructions for taking a snapshot (e.g., a point in time copy of data) of data (e.g., file system data) on the production hosts (130), etc.

In one or more embodiments of the invention, the clients (150) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the clients (150) described throughout this application.

Alternatively, in one or more embodiments of the invention, similar to the data protection module (112), the clients (150) may also be implemented as logical devices.

Figure 2:
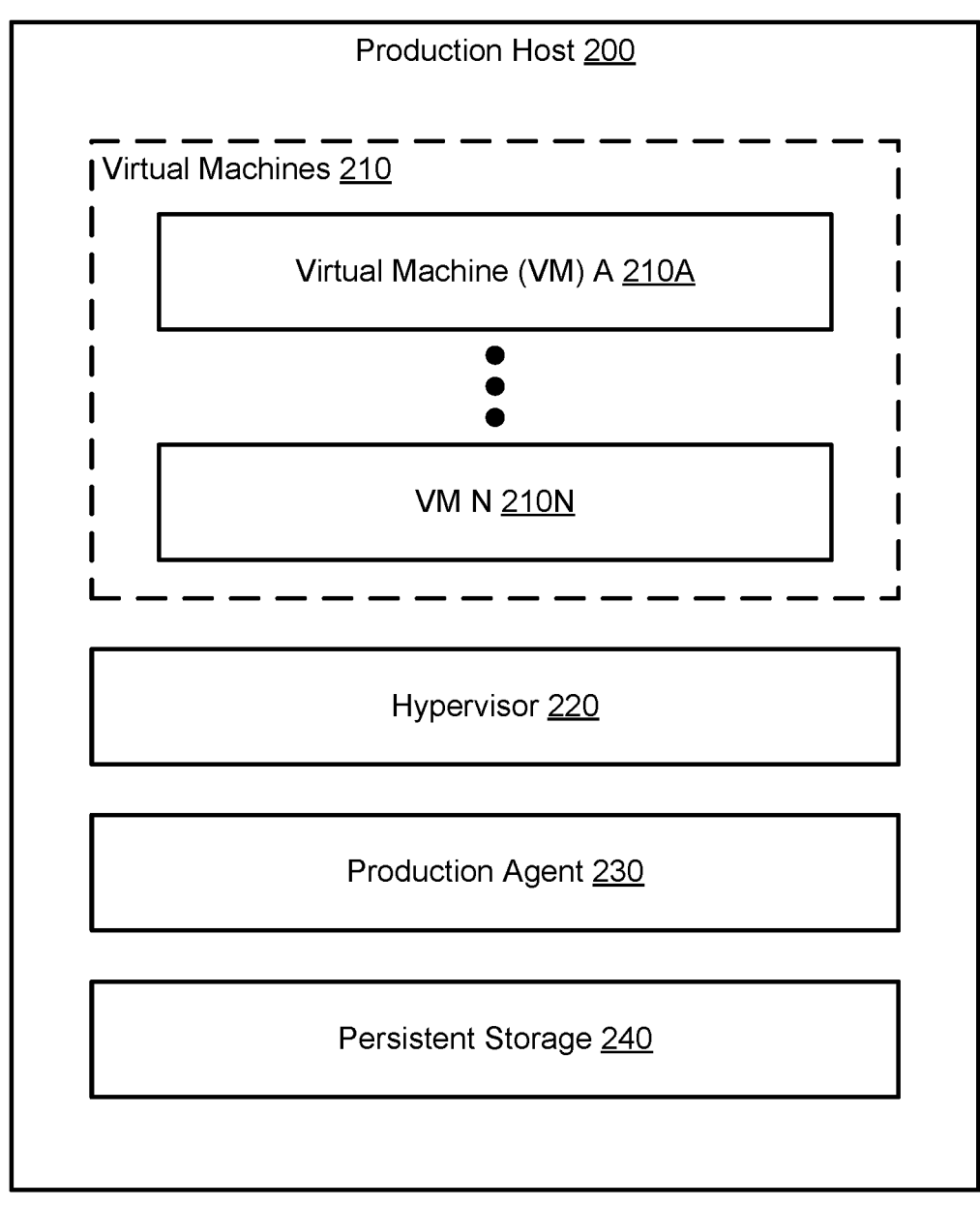
FIG. 2 shows a diagram of a production host in accordance with one or more embodiments of the invention.

Turning now to FIG. 2, FIG. 2 shows a diagram of a production host (200) in accordance with one or more embodiments of the invention. The production host (200) may be any one of the production hosts (130) discussed above in reference to FIG. 1. The production host (200) may include VMs (210), a hypervisor (220), a production agent (230), and persistent storage (240). The production host may include additional, fewer, and/or different components without departing from scope of the invention. Each component may be operably connected to any of the other component via any combination of wired and/or wireless connections. Each component illustrated in FIG. 2 is discussed below.

In one or more embodiments of the invention, the VMs (210) may be logical entities executed using computing resources of the production host (200) or using computing resources of other computing devices (e.g., mobile phones, tablet computers, laptop computers, desktop computers, servers, distributed computing systems, cloud resources, etc.) connected to the production host. Each of the VMs (VM A (210A), VM N (210N)) may be performing similar or different processes.

In one or more embodiments, the VMs (210) (and applications hosted by the VMs) may generate data (e.g., VM data) that is stored in the persistent storage (240). In one or more embodiments, the VM data may reflect the state of a VM (210A, 210N) of VMs (210).

In one or more embodiments of the invention, the VMs (210) may provide services to the clients (e.g., 150, FIG. 1). For example, the VMs (210) may host instances of databases, email servers, or other applications that are accessible to the clients (e.g., 150, FIG. 1). The VMs (210) may host other types of applications not listed above without departing from the scope of the invention. Additionally, the applications hosted by the VMs (210) may provide application services to the clients (e.g., 150, FIG. 1).

In one or more of embodiments of the invention, the VMs (210) may be implemented as computer instructions, e.g., computer code, stored in the persistent storage (240) that when executed by a processor of the production host (200) cause the production host (200) to provide the functionality of the VMs (210) described throughout the application.

In one or more embodiments of the invention, the hypervisor (220) may be configured to orchestrate the operation of the VMs (210) by allocating computing resources (e.g., central processing unit (CPU), memory, etc.) to each of the VMs (210).

In one or more embodiments of the invention, the hypervisor (220) may be a physical device including circuitry. The physical device may be, but is not limited to: a field-programmable gate array (FPGA), an application-specific integrated circuit, a programmable processor, a microcontroller, a digital signal processor, etc. The physical device may be adapted to provide the functionality of the hypervisor (220) described throughout this application.

Alternatively, in one or more of embodiments of the invention, similar to the VMs (210), the hypervisor (220) may also be implemented as computer instructions.

In one or more embodiments of the invention, the production agent (230) may be configured to locally orchestrate the performance of backup services for the VMs (210). More specifically, the production agent (230) may orchestrate the performance of the backup services under the direction of the data protection module (e.g., 112, FIG. 1). For example, the data protection module (e.g., 112, FIG. 1) sends instructions to the production agent (230) regarding: (i) when one or more backups of the VMs (210) should be generated, (ii) where the generated backup(s) should be stored, and (iii) when a VM should be restored to a previous state. Other instructions not listed above may also be sent without departing from the scope of the invention.

To orchestrate the performance of the backup services, the production agent (230) may issue commands to the hypervisor (220) to control the operation of the VMs (210) when a backup of one of the VMs (210) is being generated, or when a restoration of one of the VMs (210) is being performed.

In one or more embodiments of the invention, the production agent (230) may be a hardened entity, i.e., not modifiable by an entity that is remote to the production host (200) on which the production agent (230) is executing. In one or more embodiments, the production agent (230) may have a set of predefined functions that may be invoked by a remote entity. In one or more embodiments, the production agent (230) may not be configurable by modifying settings or associated configuration files by the remote entity.

Alternatively, in one or more embodiments of the invention, similar to the VMs (210), the production agent (230) may also be implemented as computer instructions. In one or more embodiments, similar to the hypervisor (220), the production agent (230) may also be a physical device including circuitry.

In one or more embodiments of the invention, the persistent storage (240) may be a physical computer readable storage medium. For example, the persistent storage (240) may be (or may include) hard disk drives, SSDs, tape drives, or other physical storage media. The persistent storage (240) may be other types of digital storage not listed above without departing from the scope of the invention. Additionally, the persistent storage (240) may be a virtualized storage without departing from the scope of the invention.

Figure 3:
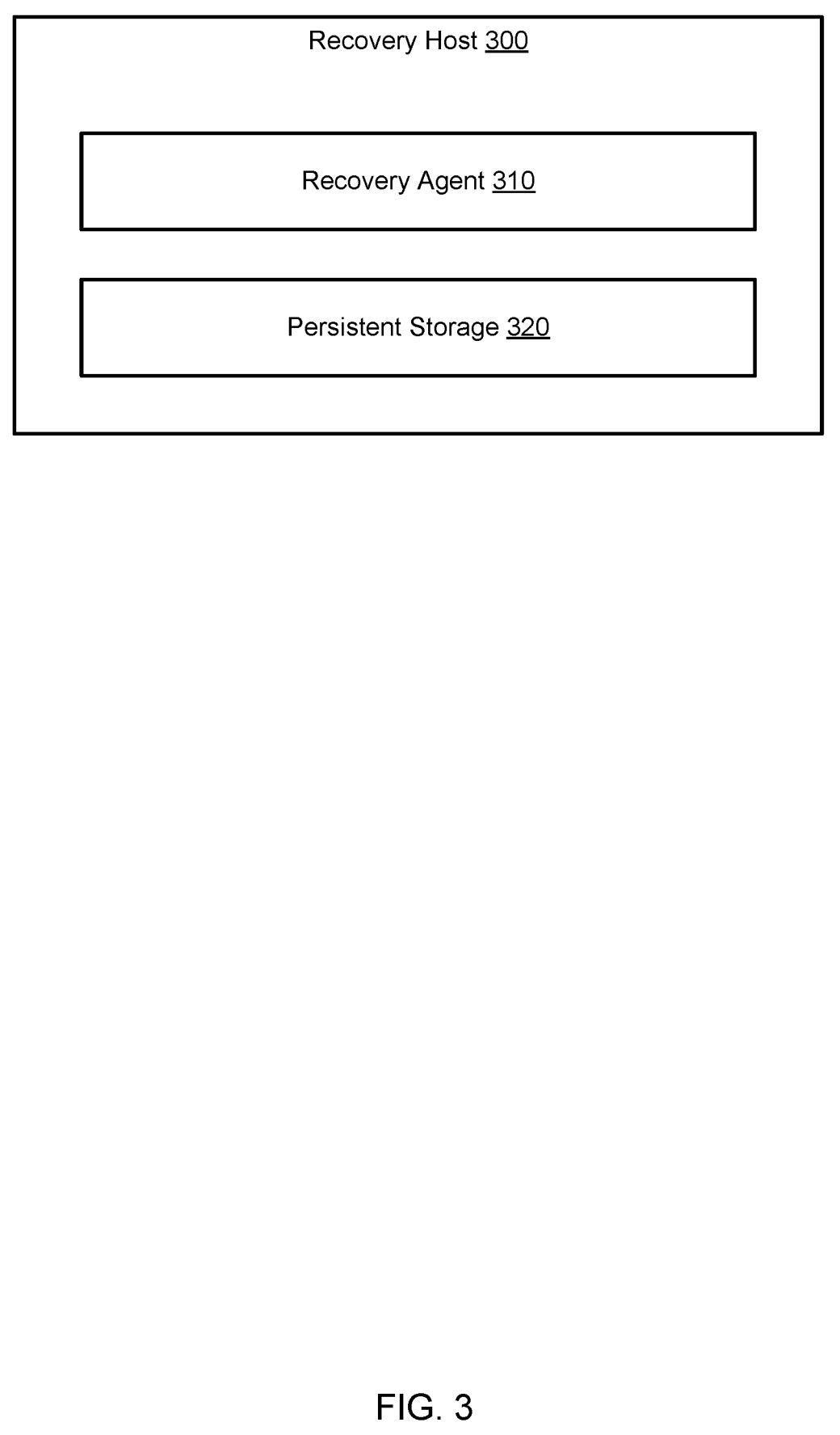

Turning now to FIG. 3, FIG. 3 shows a diagram of a recovery host (300) in accordance with one or more embodiments of the invention. The recovery host (300) may be any one of the recovery hosts (140) discussed above in reference to FIG. 1. The recovery host (300) may include a recovery agent (310) and persistent storage (320). The production host may include additional, fewer, and/or different components without departing from the scope of the invention. Each component may be operably connected to any of the other component via any combination of wired and/or wireless connections. Each component illustrated in FIG. 3 is discussed below.

In one or more embodiments of the invention, the recovery agent (310) may be configured to orchestrate the data restoration process, as discussed above in reference to FIG. 1. At the end of the data restoration process, the recovery agent (310) may store the restored data (e.g., data of the selected assets) in the persistent storage (320).

In one or more embodiments of the invention, the recovery agent (310) may be a hardened entity, i.e., not modifiable by an entity that is remote to the recovery host (300) on which the recovery agent (310) is executing. In one or more embodiments, the recovery agent (310) may have a set of predefined functions that may be invoked by a remote entity. In one or more embodiments, the recovery agent (310) may not be configurable by modifying settings or associated configuration files by the remote entity.

Alternatively, in one or more embodiments of the invention, similar to the VMs (e.g., 210, FIG. 2), the recovery agent (310) may also be implemented as computer instructions. In one or more embodiments, similar to the hypervisor (e.g., 220, FIG. 2), the recovery agent (310) may also be a physical device including circuitry.

In one or more embodiments of the invention, similar to the persistent storage (e.g., 240, FIG. 2) of the production host (e.g., 200, FIG. 2), the persistent storage (320) may be a physical computer readable storage medium.

FIGS. 4.1-4.3 show a method for executing a secure file-level restore from a BBB in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.1, the method shown in FIG. 4.1 may be executed by, for example, the above-discussed data protection module (e.g., 112, FIG. 1) and the production agent (e.g., 230, FIG. 2). Other components of the system (100) illustrated in FIG. 1 may also execute all or part of the method shown in FIG. 4.1 without departing from the scope of the invention.

In Step 400, a BBB request is received from (e.g., a user of) a client (not shown) of the clients (e.g., 150, FIG. 1) by the data protection module.

In Step 402, a BBB is initiated for a file system of the client to a backup storage (120A, 120N) of the backup storages (120) by the data protection module.

In Step 404, when the BBB is completed, the data protection module sends a file system parsing request to the file system. In one or more embodiments, the file system parsing request may be received by the production agent.

In Step 406, in response to the file system parsing request, the production agent may execute a file system parsing process to generate file system metadata. In one or more embodiments, the production agent may generate the file system metadata for each asset of the file system.

In one or more embodiments of the invention, the production agent may use a snapshot of the file system to execute the file system parsing process. In one or more embodiments, the snapshot of the file system may be a point in time copy of the file system. To generate the snapshot, the production agent may use a volume shadow copy service (VSS). The production agent may include functionality to implement the VSS.

In one or more embodiments of the invention, the file system metadata may include, but is not limited to: an identifier of an asset, an identifier of a parent folder containing an asset, a size of an asset, an offset for data of an asset stored in a VHDX file, one or more attributes of an asset, an ACL of an asset, etc.

In one or more embodiments of the invention, the identifier of the asset may be a name (e.g., file_1, folder_1, etc.) of the asset. In one or more embodiments, a parent folder may be a folder that is one level higher than a current directory of an asset in a file system hierarchy. In this manner, the identifier of the parent folder may specify the assets included in the parent folder. For example, the identifier of the parent folder may be folder_3/file_2, which specifies that folder_3 contains file_2.

In one or more embodiments of the invention, the size (e.g., 50 MB, 50 Gigabytes (50 GB), etc.) of the asset may specify how much storage of the volume is consumed by the asset. In one or more embodiments, the offset for the data of the asset may be a pointer that points to one or more blocks of the VHDX file that store the data. For example, if the offset points blocks 3 and 6 store the data, the recovery agent (e.g., 310, FIG. 3) should access blocks 3 and 6 to restore the data from the BBB.

In one or more embodiments of the invention, the attribute(s) of the asset may specify one or more characteristics of the asset. The attribute(s) of the asset may also specify how the file system should manage the asset. The attribute(s) of the asset may specify, for example, that: the asset is read-only, the asset is hidden, etc. In one or more embodiments, the ACL of the asset may be a list of permissions that defines which user has access to the asset. For example, the ACL of the asset may specify that a user with a user access level of 7 or above can access the asset. Additional details of the user access level are described below in reference to FIG. 4.3.

In Step 408, the production agent sends the file system metadata to the backup storage.

In Step 410, the data protection module may mark, on the GUI, the BBB as completed. The data protection module may then notify the user (also via the GUI) about the completion of the BBB.

In one or more embodiments of the invention, the method may end following Step 410.

Turning now to FIG. 4.2, the method shown in FIG. 4.2 may be executed by, for example, the above-discussed data protection module. Other components of the system (100) illustrated in FIG. 1 may also execute all or part of the method shown in FIG. 4.2 without departing from the scope of the invention.

In Step 412, the file system metadata is obtained from the backup storage.

In Step 414, the data protection module may analyze the file system metadata to generate an index for each asset of the file system. In one or more embodiments, the data protection module may use the indexing service to generate the index of each asset. As a result of the analysis, the data protection module may provide one or more components of the file system metadata to the indexing service. The components that are provided to the indexing service may be, for example: an identifier of an asset, one or more attributes of an asset, etc. The indexing service may then generate the index of each asset using the components.

In Step 416, the indexing service may reorder the index of each asset to reflect a file system hierarchy of the file system. The data protection module may then display, via the GUI, the reordered index to the user. In one or more embodiments, the data protection module may display the reordered index to provide a much clearer view to the user about the listed information on the GUI.

In one or more embodiments of the invention, without reordering the index of each asset, the index of each asset may not accurately reflect the file system hierarchy. For example, without reordering, the index of each asset may reflect a random layout of the file system metadata as shown in below FIG. 5.1. In particular, as shown in below FIG. 5.1, the layout may not specify which folder contains which folder and/or which folder contains which file.

In one or more embodiments of the invention, after reordering the index of each asset, the reordered index may reflect the file system hierarchy. The reordered index may also specify an access level of each asset. For example, the reordered index shown in FIG. 5.2 specifies that Folder B contains Folder D (e.g., Folder B is a parent folder of Folder D). As yet another example, the reordered index in FIG. 5.2 also specifies that the access level of Folder B is 4 and the access level of Folder D is 5.

In Step 418, the reordered index is stored in the index database (e.g., 114, FIG. 1).

In one or more embodiments of the invention, the method may end following Step 418.

Turning now to FIG. 4.3, the method shown in FIG. 4.3 may be executed by, for example, the above-discussed data protection module and the recovery agent (e.g., 310, FIG. 3). Other components of the system (100) illustrated in FIG. 1 may also execute all or part of the method shown in FIG. 4.3 without departing from the scope of the invention.

In Step 420, the data protection module may receive a BBB selection request (e.g., a request to select the BBB from the backup storages) from the user. In one or more embodiments, the data protection module may then make an API call to the backup storages to get a list of backups stored in the backup storages. Based on receiving the API call from the data protection module, the backup storages may provide the list of backups to the data protection module. The data protection module may display, via the GUI, the list of backups to the user. The user may then select the BBB from the list of backups.

In Step 422, the user is identified. In one or more embodiments, the data protection module may identify the user via a login screen displayed on the GUI. Once the login screen is displayed, the user may enter information (e.g., username, password, etc.) on the GUI. The data protection module may then identify the user based on the entered information.

In Step 424, the data protection module may determine the user access level of the user. In one or more embodiments, based on the determined user access level, the data protection module may determine one or more assets that the user can access in the BBB. For example, a user with a user access level of 7 may access assets that have an access level of 7 or lower. As yet another example, a user with a user access level of 6 may not access any assets above an access level of 6.

In Step 426, the data protection module may identify one or more assets that the user can view in the reordered index to obtain a set of permitted assets for the user. For example, if the user has a user access level of 7, the user may view assets that have an access level of 7 or lower. Examples of these "set(s) of permitted assets" are shown below in reference to FIG. 5.3.

In Step 428, the data protection module may display, via the GUI, the set of permitted assets to the user. Using the example discussed above in Step 426 as a reference, the GUI may display Folder A, File A, File B, Folder B, Folder D, Folder C, and File X to the user.

In Step 430, the data protection module may receive, from the user and via the GUI, one or more selected assets among the set of permitted assets. For example, the user may select Folder A, Folder C, and File X from among the set of permitted assets.

In Step 432, the data protection module sends a request (e.g., a selected assets restore request) to the recovery agent to restore the selected assets from the BBB to the recovery host (e.g., 300, FIG. 3). The request may include file system metadata components of the selected assets. Based on receiving the request, the recovery agent may initiate a data restoration process of the selected assets using the components provided in the request.

In Step 434, the recovery agent sends a notification about the data restoration process to the data protection module. In one or more embodiments, the notification may specify a status of the recovery process such as completed, in progress, or not completed.

In one or more embodiments of the invention, the method may end following Step 434.

FIG. 5.1 shows an example file system metadata in accordance with one or more embodiments of the invention. The example, illustrated in FIG. 5.1, is not intended to limit the scope of the embodiments disclosed herein and is independent from any other examples discussed in this application.

Turning now to FIG. 5.1, FIG. 5.1 shows a diagram of an example file system metadata generated at the end of Step 406 of FIG. 4.1. For the sake of brevity, not all components of the example file system metadata may be illustrated in FIG. 5.1.

As shown in FIG. 5.1, the example file system metadata includes: (i) Folder A, (ii) File B, (iii) File A, (iv) Folder C, (v) Folder B, (vi) Folder D, (vii) File X, (viii) File Y, and (ix) File Z. Each of these contents of the file system metadata is not currently configured in a hierarchical manner. Said another way, the contents of the example file system metadata are arranged in a random order.

FIGS. 5.2 and 5.3 show an example reordered index in accordance with one or more embodiments of the invention. The example, illustrated in FIGS. 5.2 and 5.3, is not intended to limit the scope of the embodiments disclosed herein and is independent from any other examples discussed in this application.

Turning now to FIG. 5.2, FIG. 5.2 shows a diagram of an example reordered index generated at the end of Step 416 of FIG. 4.2. For the sake of brevity, not all components of the example reordered index may be illustrated in FIG. 5.2.

FIG. 5.2 shows an example reordered index included in the file system metadata. As seen in FIG. 5.2, the contents of the file system metadata are configured in a hierarchical structure.

The hierarchical structure specifies which folder contains which folder and/or which folder contains which file. As shown in FIG. 5.2, the hierarchical structure specifies: (i) Folder B contains Folder D, (ii) Folder C contains File X, File Y, and File Z, and (iii) Folder A contains File A, File B, Folder B, and Folder C.

The hierarchical structure also specifies an access level of each file and/or folder. As shown in FIG. 5.2, the hierarchical structure specifies: (i) Folder A has an access level of 1, (ii) File A has an access level of 3, (iii) File B has an access level of 3, (iv) Folder B has an access level of 4, (v) Folder D has an access level of 5, (vi) Folder C has an access level of 3, (vii) File X has an access level of 6, (viii) File Y has an access level of 8, and (ix) File Z has an access level of 10.

An access level of a file specifies which user(s) can view the file. As shown in FIG. 5.2, File Y has the access level of 8. To be able to view File Y, a user should have a user access level of at least 8 or higher. Similarly, Folder C has the access level of 3. To be able to view Folder C, a user should have a user access level of at least 3 or higher.

Turning now to FIG. 5.3, FIG. 5.3 shows a diagram of an example reordered index generated at the end of Step 426 of FIG. 4.3. For the sake of brevity, not all components of the example reordered index may be illustrated in FIG. 5.3.

As shown in FIG. 5.3, a user has a user access level of 7. Based on the user access level, the user can view files and/or folders that have an access level of 7 or lower in the hierarchical structure shown in FIG. 5.2.

Referring back to FIG. 5.3, the user with the user access level of 7 can view Folder A, File A, File B, Folder B, Folder D, Folder C, and File X in the hierarchical structure. The user cannot view File Y and File Z in the hierarchical structure because the user access level of the user is lower than the access levels of File Y and File Z.

Turning now to FIG. 6, FIG. 6 shows a diagram of a computing device in accordance with one or more embodiments of the invention.

In one or more embodiments of the invention, the computing device (600) may include one or more computer processors (602), non-persistent storage (604) (e.g., volatile memory, such as RAM, cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN), such as the Internet, mobile network, or any other type of network) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a block-based backup (BBB), the method comprising:

receiving a BBB request from a user to back up a file system (FS) to a backup storage;

initiating, based on the BBB request, backing up of the FS to the backup storage as the BBB;

sending an FS parsing request to the FS, wherein the FS parsing request is sent after the FS is backed up to the backup storage, wherein the FS is backed up in accordance with a backup schedule that is configured based on a user's recovery point objective;

obtaining FS metadata, wherein the FS metadata is generated for each asset of the FS using a snapshot of the FS and stored to the backup storage in response to the FS parsing request, wherein the FS metadata comprises an identifier of a parent folder comprising an asset, a size of the asset, an offset for data of the asset stored in a file of the FS, and an attribute of the asset, wherein the attribute specifies how the FS should manage the asset;

marking, after the FS metadata is stored to the backup storage, the BBB as completed on a graphical user interface (GUI) to notify to the user;

obtaining, after the marking, the FS metadata from the backup storage;

analyzing the FS metadata to generate an index for each asset of the FS;

reordering the index of each asset to generate a reordered index, wherein the reordered index reflects an FS hierarchy of the FS and an access level of each asset, wherein the access level of each asset specifics a user access level the user must have to view each asset on the GUI; and after the reordered index is displayed:

receiving a BBB selection request from the user;

determining, in response to the BBB selection request, a user access level of the user;

identifying assets in the reordered index to define a set of permitted assets for the user, wherein the access level of each asset of the set of permitted assets is less than or equal to the user access level of the user;

displaying the set of permitted assets on the GUI, wherein assets with access levels greater than the user access level are not displayed on the GUI;

receiving selected assets among the set of permitted assets via the GUI, wherein the selected assets are selected by the user via the GUI;

sending a restore request to a recovery agent (RA) to restore the selected assets from the BBB, wherein the restore request comprises details associated with the FS metadata; and receiving a notification from the RA regarding a restoring status of the selected assets.

2. The method of claim 1, wherein the selected assets are restored in a recovery host.

3. The method of claim 1, wherein the reordered index is stored in an index database.

4. The method of claim 1, wherein the FS metadata further comprises identifiers of the selected assets and at least one access control list (ACL) associated with the selected assets.

5. The method of claim 1, wherein the FS is backed up using a virtual hard disk (VHDX) file format.

6. The method of claim 1, wherein the FS is a new technology file system (NTFS).

7. The method of claim 1, wherein the selected assets are files and folders of the FS.

8. A non-transitory computer readable medium comprising computer readable program code, which when executed by a computer processor enables the computer processor to perform a method for managing a block-based backup (BBB), the method comprising:

receiving a BBB request from a user to back up a file system (FS) to a backup storage;

initiating, based on the BBB request, backing up of the FS to the backup storage as the BBB;

sending an FS parsing request to the FS, wherein the FS parsing request is sent after the FS is backed up to the backup storage, wherein the FS is backed up in accordance with a backup schedule that is configured based on a user's recovery point objective;

obtaining FS metadata, wherein the FS metadata is generated for each asset of the FS using a snapshot of the FS and stored to the backup storage in response to the FS parsing request, wherein the FS metadata comprises an identifier of a parent folder comprising an asset, a size of the asset, an offset for data of the asset stored in a file of the FS, and an attribute of the asset, wherein the attribute specifies how the FS should manage the asset;

marking, after the FS metadata is stored to the backup storage, the BBB as completed on a graphical user interface (GUI) to notify to the user;

obtaining, after the marking, the FS metadata from the backup storage;

analyzing the FS metadata to generate an index for each asset of the FS;

reordering the index of each asset to generate a reordered index, wherein the reordered index reflects an FS hierarchy of the FS and an access level of each asset, wherein the access level of each asset specifics a user access level the user must have to view each asset on the GUI; and after the reordered index is displayed:

receiving a BBB selection request from the user;

determining, in response to the BBB selection request, a user access level of the user;

identifying assets in the reordered index to define a set of permitted assets for the user, wherein the access level of each asset of the set of permitted assets is less than or equal to the user access level of the user;

displaying the set of permitted assets on the GUI, wherein assets with access levels greater than the user access level are not displayed on the GUI;

receiving selected assets among the set of permitted assets via the GUI, wherein the selected assets are selected by the user via the GUI;

sending a restore request to a recovery agent (RA) to restore the selected assets from the BBB, wherein the restore request comprises details associated with the FS metadata; and receiving a notification from the RA regarding a restoring status of the selected assets.

9. The non-transitory computer readable medium of claim 8, wherein the selected assets are restored in a recovery host.

10. The non-transitory computer readable medium of claim 8, wherein the reordered index is stored in an index database.

11. The non-transitory computer readable medium of claim 8, wherein the FS metadata further comprises identifiers of the selected assets and at least one access control list (ACL) associated with the selected assets.

12. The non-transitory computer readable medium of claim 8, wherein the FS is backed up using a virtual hard disk (VHDX) file format.

13. The non-transitory computer readable medium of claim 8, wherein the FS is a new technology file system (NTFS).

14. The non-transitory computer readable medium of claim 8, wherein the selected assets are files and folders of the FS.

15. A system for managing a block-based backup (BBB), the system comprising:

a processor comprising circuitry, memory comprising instructions, which when executed perform a method, the method comprising:

receiving a BBB request from a user to back up a file system (FS) to a backup storage;

initiating, based on the BBB request, backing up of the FS to the backup storage as the BBB;

sending an FS parsing request to the FS, wherein the FS parsing request is sent after the FS is backed up to the backup storage, wherein the FS is backed up in accordance with a backup schedule that is configured based on a user's recovery point objective;

obtaining FS metadata, wherein the FS metadata is generated for each asset of the FS using a snapshot of the FS and stored to the backup storage in response to the FS parsing request, wherein the FS metadata comprises an identifier of a parent folder comprising an asset, a size of the asset, an offset for data of the asset stored in a file of the FS, and an attribute of the asset, wherein the attribute specifies how the FS should manage the asset;

marking, after the FS metadata is stored to the backup storage, the BBB as completed on a graphical user interface (GUI) to notify to the user;

obtaining, after the marking, the FS metadata from the backup storage;

analyzing the FS metadata to generate an index for each asset of the FS;

reordering the index of each asset to generate a reordered index, wherein the reordered index reflects an FS hierarchy of the FS and an access level of each asset, wherein the access level of each asset specifics a user access level the user must have to view each asset on the GUI; and after the reordered index is displayed:

receiving a BBB selection request from the user;

determining, in response to the BBB selection request, a user access level of the user;

identifying assets in the reordered index to define a set of permitted assets for the user, wherein the access level of each asset of the set of permitted assets is less than or equal to the user access level of the user;

displaying the set of permitted assets on the GUI, wherein assets with access levels greater than the user access level are not displayed on the GUI;

receiving selected assets among the set of permitted assets via the GUI, wherein the selected assets are selected by the user via the GUI;

sending a restore request to a recovery agent (RA) to restore the selected assets from the BBB, wherein the restore request comprises details associated with the FS metadata; and receiving a notification from the RA regarding a restoring status of the selected assets.

16. The system of claim 15, wherein the selected assets are restored in a recovery host.

17. The system of claim 15, wherein the reordered index is stored in an index database.

18. The system of claim 15, wherein the FS metadata further comprises identifiers of the selected assets and at least one access control list (ACL) associated with the selected assets.

19. The system of claim 15, wherein the FS is backed up using a virtual hard disk (VHDX) file format.

20. The system of claim 15, wherein the FS is a new technology file system (NTFS).

* * * * *